2,963,363
SODIUM CARBONATE RECOVERY

Roger L. Pilloton, Niagara Falls, N.Y., assignor to Union Carbide Corporation, a corporation of New York No Drawing. Filed Dec. 9, 1957, Ser. No. 701,286

8 Claims. (Cl. 75—108)

This invention relates to a process for recovering sodium carbonate from leach liquors in the recovery of group VB and group VIB metals from their ores.

One industrial procedure for recovery of metals such as tungsten, molybdenum, vanadium, uranium and the other metals of group VB and group VIB of the periodic table (Handbook of Chemistry and Physics, 31st Edition, page 336, Chemical Rubber Publishing Company, 1949) comprises leaching the ore with an aqueous solution of sodium carbonate, generally under pressure. The metal values are solubilized as sodium salts of weak acids of the metals. Usually a large excess of sodium carbonate is employed to insure a complete solubilization of the metal values. For example, in the recovery of tungsten from scheelite, more than about six times the theoretical amount of sodium carbonate is generally employed. It would be desirable to recover the sodium carbonate for reuse in the leaching step. However, by the present methods for removing the unwanted elements present in the tungsten leach liquor, sulfuric acid is added whereby the sodium carbonate is decomposed and recovery prevented.

It is an object of this invention to provide a process for the recovery of the sodium carbonate present in the leach liquor resulting from the leaching of ore with aqueous sodium carbonate solutions.

It is another object to provide a process for the simultaneous concentration of metal values in a leach liquor resulting from the leaching of ores with aqueous sodium carbonate solution and the removal of sodium carbonate therefrom.

Other objects will be apparent from the disclosure and appended claims.

The process which satisfies the object of the invention comprises adjusting, to a pH of at least about 12, the leach liquor produced by leaching, with an aqueous sodium carbonate solution, an ore of a metal of group VB and VIB of the periodic table, and subsequently cooling the leach liquor to a temperature below the water-sodium carbonate decahydrate binary eutectic temperature and above the ternary invariant point temperature of the solution, and separating the resulting precipitate from the aqueous solution. In this temperature range, ice and sodium carbonate decahydrate precipitate from the solution, thereby effectively removing the sodium carbonate from solution while simultaneously concentrating the solution in the metal values. Further purification treatment of the aqueous solution may now be effected with a high degree of efficiency, and the recovered sodium carbonate may be reused in leaching additional ore.

The invention will be described hereinafter with respect to the recovery of tungsten values from scheelite. Scheelite is pressure-leached at about 200 pounds per square inch at a temperature approximately 200° C. with a sodium carbonate solution, to produce soluble sodium tungstate according to the equation:

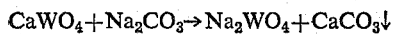

About six times the theoretical amount of sodium carbonate is generally employed, and consequently the resulting solution contains a large excess of sodium carbonate which, as stated previously, is generally lost by later $H_2SO_4$ additions.

In accordance with the present invention, however, this leach liquor is treated with sodium hydroxide whereby the pH of the solution is adjusted to a value of at least 12. The solution is then cooled to a temperature below about 0° C. but not below about —8° C., the ternary invariant point temperature of the solution. By this action, most of the sodium carbonate is crystallized out of solution in the form of sodium carbonate decahydrate ($Na_2CO_3 \cdot 10H_2O$) together with a considerable percentage of water. The remaining solution is strongly concentrated in tungsten.

The solid phase, consisting of sodium carbonate and ice, may be easily separated from the concentrated solution by any standard technique such as centrifugation or filtration or other suitable means.

It is important when practicing the invention that the temperature of the leach liquor be reduced below at least 0° C., but it should not be reduced below the ternary invariant point temperature; at the ternary invariant point temperature the sodium salt of the weak acid of the metal values is also crystallized, thereby depleting the solution in the metal values and further complicating the separation technique. For example, when separating tungsten from scheelite, the basic leach liquor should not be cooled below a temperature of about —8° C. since sodium tungstate will crystallize out below this temperature.

To illustrate both the advantages of the present invention and the advantage obtained by reducing the temperature as close to the ternary invariant point temperature as possible, a two-liter sample of a tungsten leach liquor having a pH of about 12 was cooled, and the chemical composition of the phases were determined at various temperatures. Separation of the solidified components was accomplished by filtration in a Buchner funnel. The following results were obtained:

| Temp., ° C. | Composition—Weight Percent | | | Percentage Removed | |
|---|---|---|---|---|---|
| | $Na_2WO_4$ | $Na_2CO_3$ | $H_2O$ | $Na_2CO_3$ | $H_2O$ |
| 20 | 4.8 | 6.8 | 88.4 | None | None |
| —4 | 10.0 | 5.0 | 85.0 | 64.8 | 55.3 |
| —5 | 16.0 | 4.4 | 79.6 | 80.6 | 73.6 |
| —6 | 22.0 | 3.0 | 75.0 | 90.4 | 82.1 |
| —7 | 28.0 | 2.0 | 70.0 | 95.0 | 86.9 |

To illustrate the invention on a larger scale three 100 gallon samples of a solution containing 5 weight percent of sodium tungstate, 7 weight percent of sodium carbonate and 88 weight percent of water, were treated according to the process of the present invention. Each of the solutions was adjusted to a pH of 12.0 with sodium hydroxide. The samples were then cooled to —7° C. The product in each case was a slush with little liquid remaining. The concentrated sodium tungstate solution was separated from the ice and sodium carbonate crystals by centrifugation in a 17 inch centrifuge with a No. 255 cotton duck filter cloth. In each case more than 95 percent of the sodium carbonate and 80 percent of the water was removed from the leach liquor. The sodium tungstate concentration in the filtrate was about 28 percent by weight. The ice and sodium carbonate crystals resulting from the separation were washed with a saturated solution of sodium carbonate at —2° C. to remove any mother liquor which was adsorbed on the crystals. One part by weight of the washing solution to three parts of the crystals was sufficient to recover any tungsten which might otherwise have remained in the crystals. Chemical analysis showed that the tungsten trioxide content of the ice and sodium carbonate crystals was decreased, by washing, from 0.89 weight percent down to 0.02 weight percent.

In another example of the invention one liter of a solution containing 67.6 grams of sodium carbonate and 65.7 grams of sodium tungstate and having a pH of about 12 was cooled down to about —7.5. The sodium carbonate and ice crystals that formed were filtered from the solution. About 200 milliliters of solution remained. This solution contained 8.0 grams sodium carbonate and 65.7 grams of sodium tungstate. As may be seen, no tungstate was lost in the cooling process, and about 88 percent of the sodium carbonate was recovered.

While the invention has been described with respect to the recovery of tungsten, the invention is not so limited. It applies equally well to the other metals of the group VB and VIB of the periodic table. This may be illustrated by the following examples.

A two-liter solution, containing 5.4 weight percent of sodium molybdate, 5.5 weight percent of sodium carbonate and the balance water, and having a pH of about 12, was cooled to —4° C. The crystals which formed were filtered from the solution and washed with cold sodium carbonate solution. Analysis showed that the precipitate consisted principally of an ice-sodium carbonate decahydrate mixture while the filtrate contained 9.9 weight percent of sodium molybdate ($Na_2MoO_4$) and 3.9 weight percent of sodium carbonate. This indicates that 62 percent of the sodium carbonate and 47.2 percent of the water were removed from the original mixture.

In another example a two-liter solution containing 3.6 percent by weight of sodium vanadate, 9.0 weight percent sodium carbonate, and the balance water, was cooled to —4° C. A concentrated solution containing 6.1 weight percent of sodium vanadate ($NaVO_3$), 8.2 weight percent of sodium carbonate, the balance water, resulted. The amount of sodium carbonate recovered was 48.0 percent; 40.9 percent of the water was removed.

As may be seen from the foregoing examples, the present invention provides a simple process for removing sodium carbonate from leach liquors. The process may be employed equally well with any of the metals of group VB and group VIB of the periodic table. In addition to the recovery of the sodium carbonate, concentration of the leach liquor in the metal values to be recovered is also effected.

What is claimed is:

1. In the recovery of at least one metal selected from the group consisting of metals of groups VB and VIB of the periodic table from an ore by leaching the ore with an excess of a sodium carbonate solution whereby the values of said selected metal are dissolved in the leach liquor as a sodium salt of a weak acid of said selected metal, the improvement which comprises adjusting the pH of said leach liquor to at least about 12; cooling said leach liquor to a temperature below the water-sodium carbonate decahydrate binary eutectic temperature and above the ternary invariant point temperature of said leach liquor whereby sodium carbonate decahydrate is crystallized from solution without substantial crystallization of the sodium salt of the weak acid of the metal values; and separating the resulting precipitate from the leach liquor.

2. A process in accordance with claim 1 wherein the leach liquor is cooled to a temperature approximating, but not exceeding, the ternary invariant point temperature of the leach liquor.

3. In the recovery of tungsten from an ore by leaching the ore with an excess of a sodium carbonate solution whereby the tungsten is dissolved in the leach liquor as a sodium salt of a weak acid of tungsten, the improvement which comprises adjusting the pH of said leach liquor to at least about 12; cooling said leach liquor to a temperature below the water-sodium carbonate decahydrate binary eutectic temperature and above the ternary invariant point temperature of said leach liquor whereby sodium carbonate decahydrate is crystallized from solution without substantial crystallization of the sodium salt of the weak acid of the metal values; and separating the resulting precipitate from the leach liquor.

4. A process in accordance with claim 3 wherein the leach liquor is cooled to a temperature approximating, but not exceeding, the ternary invariant point temperature of the leach liquor.

5. In the recovery of molybdenum from an ore by leaching the ore with an excess of a sodium carbonate solution whereby the molybdenum is dissolved in the leach liquor as a sodium salt of a weak acid of molybdenum, the improvement which comprises adjusting the pH of said leach liquor to at least about 12; cooling said leach liquor to a temperature below the water-sodium carbonate decahydrate binary eutectic temperature and above the ternary invariant point temperature of said leach liquor whereby sodium carbonate decahydrate is crystallized from solution without substantial crystallization of the sodium salt of the weak acid of the metal values; and separating the resulting precipitate from the leach liquor.

6. A process in accordance with claim 5 wherein the leach liquor is cooled to a temperature approximating, but not exceeding, the ternary invariant point temperature of the leach liquor.

7. In the recovery of vanadium from an ore by leaching the ore with an excess of a sodium carbonate solution whereby the vanadium is dissolved in the leach liquor as a sodium salt of a weak acid of vanadium, the improvement which comprises adjusting the pH of said leach liquor to at least about 12; cooling said leach liquor to a temperature below the water-sodium carbonate decahydrate binary eutectic temperature and above the ternary invariant point temperature of said leach liquor whereby sodium carbonate decahydrate is crystallized from solution without substantial crystallization of the sodium salt of the weak acid of the metal values; and separating the resulting precipitate from the leach liquor.

8. A process in accordance with claim 7 wherein the leach liquor is cooled to a temperature approximating, but not exceeding, the ternary invariant point temperature of the leach liquor.

References Cited in the file of this patent

UNITED STATES PATENTS

| 1,869,621 | Rosenstein el al. | Aug. 2, 1932 |

FOREIGN PATENTS

| 112,417 | Australia | Jan. 28, 1941 |
| 457,964 | Canada | July 5, 1949 |

OTHER REFERENCES

Thorpe's Dictionary of Applied Chemistry, 4th ed., vol. X, page 818. Published 1950 by Longmans, Green & Co., N.Y.